March 4, 1958

G. C. EVANS 2,825,482

QUICK ATTACHABLE AND DETACHABLE CORE HOLE CLOSING DEVICE

Filed March 21, 1957

INVENTOR.
Glenn C. Evans
BY
M. Talbert Dick
ATTORNEY

Witness.
A. S. Martin

United States Patent Office 2,825,482
Patented Mar. 4, 1958

2,825,482

QUICK ATTACHABLE AND DETACHABLE CORE HOLE CLOSING DEVICE

Glenn C. Evans, Fort Dodge, Iowa

Application March 21, 1957, Serial No. 647,634

5 Claims. (Cl. 220—25)

This invention relates to hole closing means and more particularly to devices for closing the core holes in the engine blocks of water cooled internal combustion engines, and is an improvement on the structure shown in my copending application Serial No. 407,511, filed February 1, 1954.

The engines of passenger automobiles and trucks at time of manufacture have a number of casting or core holes in their blocks. Most everyone considers these openings as safety ones inasmuch as they are closed by a friction press cap or disc which are easily knocked out. However, such is not the purpose of such closing caps and their use is merely a cheap means for closing the core holes. Often these press cap plugs become accidentally detached resulting in serious damage to the engine. Also, in the repair or cleaning of the engine, they must be removed and replaced. This, however, is often most difficult and especially in the replacement of a new one, due to the compactness of present engines within the engine compartment of the vehicle. Some of these core holes are almost inaccessible for the drive press fitting of a new cap plug. Also, such press cap plugs often leak.

While my herebefore disclosed core hole closing device successfully accomplished some installations, the engines of present day automotive vehicles have such narrow water passageways adacent their cylinder bores that such large headed units cannot be inserted. I found that cutting down the size of the large head did not solve the problem inasmuch as the weakened head buckled when tightened with a wrench.

Therefore, the principal object of my invention is to provide a mechanical core plug that takes up little room for insertion and one that will not become broken and distorted when tightened by a wrench.

A further object of this invention is to provide a mechanical core plug that may be easily installed or removed without hammering or press fitting the same.

A further object of this invention is to provide a mechanical core plug that can easily be installed at locations where there is only little work space.

A still further object of my invention is to provide a core plug that does not leak.

Still further objects of my invention are to provide a mechanical core plug that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Figure 3:
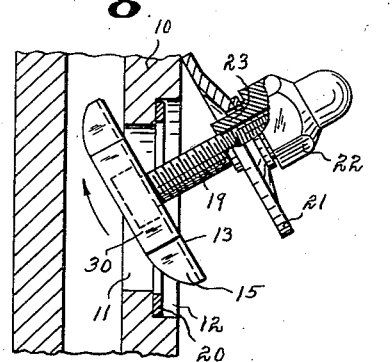
Fig. 3 is a side sectional view of the device illustrating its placement in or removal from a core hole.

Referring to the drawings in detail, I have used the numeral 10 to designate the wall of an engine block. The numeral 11 designates a core hole in the engine block wall. Such core holes have a larger shouldered recess 12 on the outer side of the wall as shown in Fig. 3. It is to such a core hole that I use my sealing device and which I will now describe in detail.

Figure 1:
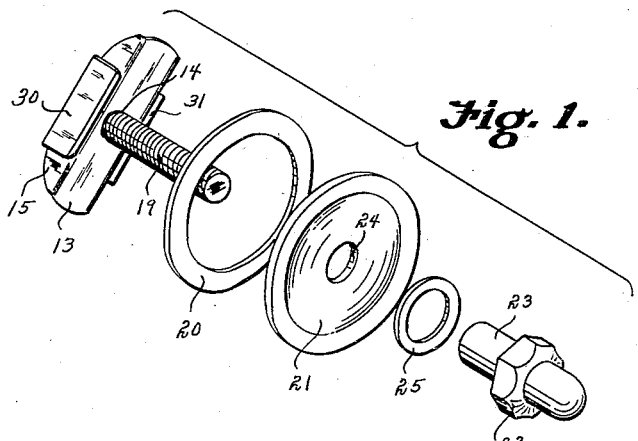
Fig. 1 is a perspective exploded view of the various parts of my device.
Figure 2:
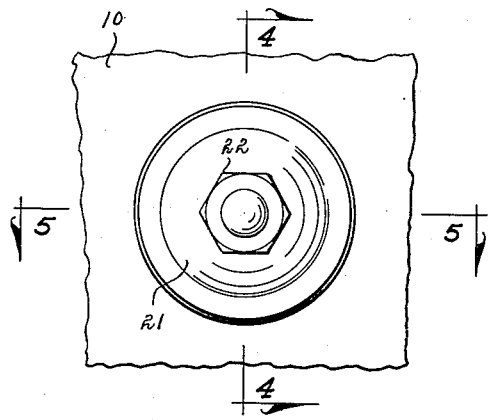
Fig. 2 is an outside view of the device installed.
Figure 4:
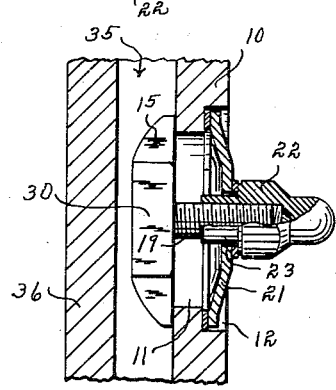
Fig. 4 is a cross sectional view of the installed device taken on line 4—4 of Fig. 2.
Figure 5:
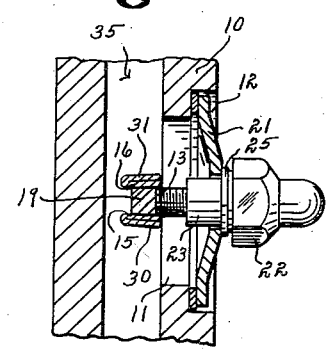
Fig. 5 is a cross sectional view of the installed device taken on line 5—5 of Fig. 4 and more fully illustrates its construction.

The numeral 13 is used to generally designate an anchor head. This anchor head 13 is of simple construction and may be formed from a washer or like by bending two of its side portions at each side of its hole 14, upwardly to form the parallel ear portions 15 and 16. Each of these ears are bent outwardly and back upon themselves to form a bar brace portion and are designated by the numerals 30 and 31, respectively. Thus, at each outer side of the stub base of each of the ears 15 and 16 is a strengthening bar. These bars are formed in an elongated rectangular shape as shown in Fig. 1. By this construction the free end marginal edges of the portions 30 and 31 will be flush and parallel with the bottom plane of the base portion 13. Also, these strengthening bars are centrally located to extend at both sides of the hole 14 and have their lengths substantially parallel with each other. This curvature of the two ear portions 15 and 16 is of importance in the successful operation of my device and which will later be described. The threaded stem of the bolt 19 extends through the hole 14 of the washer head 13. After the fixed head of the bolt is placed between the ears 15 and 16, they are compressed together as shown in Fig. 4, thereby locking the bolt head between them and holding the bolt head adjacent the hole 14. The bolt and head 13 thereby become one unit for all intents and purposes. The numeral 20 designates a washer gasket designed to rest within the shouldered recess 12 of the engine block. The numeral 21 designates a washer curved outwardly at its center portion and having a diameter greater than the diameter of the inner core hole 11, but of a diameter slightly less than that of the diameter of the shouldered recess 12. The numeral 22 designates an internally threaded nut adapted to be threaded onto the shank of the bolt 19 and having an inwardly extending cylindrical barrel portion 23 as shown in Fig. 1. The hole 24 in the dome washer cap 21 is of such diameter that the cylindrical portion 23 loosely extends through the same as shown in Fig. 5. The numeral 25 designates a washer gasket between the outer side of the dome cap washer 21 and the head of the nut portion 22.

The practical operation of my device is as follows: With the unit assembled as shown in Fig. 3 and with the nut 22 unscrewed to a point where the barrel portion 23 is barely engaging the threads of the bolt 19, the anchor head portion 13 is placed within the core opening where one end of the head 13 is in back and beyond the core hole 11. This first movement in the installation of the device is illustrated in Fig. 3. At this point of insertion, the bolt 19 will be extending at an acute angle to the wall of the engine block and merely by bringing the bolt 19 downwardly and to a transverse position relative to the engine wall, the anchor head 13 will rotate to a position inside the engine block. Thus it will be seen that the length diameter of the anchor head 13 is greater than that of the inside diameter of the core hole 11. The rotation of the anchor head 13 to a position inside the engine block is made possible by the important feature of having the two ear portions 15 and 16 curved, i. e., the peripheries of the ears 15 and 16 cut the arc of a circle. Once the anchor head portion 13 is on the inside of the engine wall with the two length ends of the anchor head overlapping the core hole 11, it is merely necessary to tighten the nut 22, thereby bringing the sealing cap 21 into setting position within the recess 12 as shown in Fig. 4. With the nut 22 thus tightened, the core hole will be successfully closed and sealed against leakage and against accidental opening.

By making the sealing cap 21 of dome shape, it also is of substantial strength. The gaskets 20 and 25 definitely seal the core hole against leakage.

To remove the device it is merely necessary to substantially unthread the nut 22 and rotate the anchor head 13 out of the core hole 11. My device not only successfully seals the core hole, but may be installed or removed easily and quickly and even when the work space adjacent the outer side of the core hole is most limited.

By the presence of the strengthening bar portions 30 and 31 resting across the head 13 and with their widths parallel with the longitudinal axis of the bolt 19, the tightening of the nut 22 will not break, bend, or distort the head unit. Also by bending the ears 15 and 16 back upon themselves, the height or width of the ears are greatly reduced thereby making it possible to slip the head unit into the space 35 between the block wall 10 and cylinder wall 36. The lengths of the portions 30 and 31 are less than the widths of the base of the ears 15 and 16 as shown in Fig. 4.

Although I have described my device for use in the closing of core holes, the device can be used to advantage for other purposes, not only wherein it is desired to close an opening, but to anchor one end of a bolt extending through an opening in any type of wall structure.

Some changes may be made in the construction and arrangement of my quick attachable and detachable core hole closing device without departing from the real spirit and purpose of my invention, and it is my intention to cover by my claims, any modified forms of structure or use of mechanical equivalents which may be reasonably included within their scope.

I claim:

1. In combination, a wall member having a hole therein, an anchor member having an apertured elongated flat portion of a length greater than the diameter of the hole in said wall member residing diametrically across said hole on one face of said wall and in flat-wise engagement therewith, two rounded spaced apart ears secured to the side edges of said elongated flat portion and extending away from said wall and flat portion at right angles thereto and each bent back upon itself, a bolt having a head on one end thereof extending through the aperture of the elongated flat portion of the anchor member disposed between said two ears, said bolt also extending through the hole in the wall member and projecting beyond the face of the wall remote from the anchor member, a centrally apertured hollow dome-shaped sealing cap positioned against the face of said wall remote from the anchor member in covering relation to the hole of said wall with the aperture of said cap receiving said bolt, and a nut on said bolt disposed on the side of said cap remote from said anchor for tightening the sealing cap into sealing relation across said wall hole.

2. In combination, a wall member having a hole therein, an anchor member having an apertured elongated flat portion of a length greater than the diameter of the hole in said wall member residing diametrically across said hole on one face of said wall and in flat-wise engagement therewith, two spaced apart ears secured to the side edges of said elongated flat portion and extending away from said wall and flat portion at right angles thereto and each bent back upon itself, a bolt having a head on one end thereof extending through the aperture of the elongated flat portion of the anchor member disposed between said two ears, said bolt also extending through the hole in the wall member and projecting beyond the face of the wall remote from the anchor member, a centrally apertured hollow dome-shaped sealing cap positioned against the face of said wall remote from the anchor member in covering relation to the hole of said wall with the aperture of said cap receiving said bolt, and a nut on said bolt disposed on the side of said cap remote from said anchor for tightening the sealing cap into sealing relation across said wall hole.

3. In combination, a wall member having a hole therein, an anchor member having an apertured elongated flat portion of a length greater than the diameter of the hole in said wall member residing diametrically across said hole on one face of said wall and in flat-wise engagement therewith, two rounded spaced apart ears secured to the side edges of said elongated flat portion and extending away from said wall and flat portion at right angles thereto and each bent outwardly and back upon itself, a bolt having a head on one end thereof extending through the aperture of the elongated flat portion of the anchor member disposed between said two ears, said bolt also extending through the hole in the wall member and projecting beyond the face of the wall remote from the anchor member, a centrally apertured hollow dome-shaped sealing cap positioned against the face of said wall remote from the anchor member in covering relation to the hole of said wall with the aperture of said cap receiving said bolt, and a nut on said bolt disposed on the side of said cap remote from said anchor for tightening the sealing cap into sealing relation across said wall hole.

4. In combination, a wall member having a hole therein, an anchor member having an apertured elongated flat portion of a length greater than the diameter of the hole in said wall member residing diametrically across said hole on one face of said wall and in flat-wise engagement therewith, two rounded spaced apart ears secured to the side edges of said elongated flat portion and extending away from said wall and flat portion at right angles thereto and each bent back upon itself; each of said portions of said ears being in the form of a rectangular bar, a bolt having a head on one end thereof extending through the aperture of the elongated flat portion of the anchor member disposed between said two ears, said bolt also extending through the hole in the wall member and projecting beyond the face of the wall remote from the anchor member, a centrally apertured hollow dome-shaped sealing cap positioned against the face of said wall remote from the anchor member in covering relation to the hole of said wall with the aperture of said cap receiving said bolt, and a nut on said bolt disposed on the side of said cap remote from said anchor for tightening the sealing cap into sealing relation across said wall hole.

5. In combination, a wall member having a hole therein, an anchor member having an apertured elongated flat portion of a length greater than the diameter of the hole in said wall member residing diametrically across said hole on one face of said wall and in flat-wise engagement therewith, two rounded spaced apart ears secured to the side edges of said elongated flat portion and extending away from said wall and flat portion at right angles thereto and each bent back upon itself; each of said portions of said ears being in the form of an elongated rectangular bar, a bolt having a head on one end thereof extending through the aperture of the elongated flat portion of the anchor member disposed between said two ears, said bolt also extending through the hole in the wall member and projecting beyond the face of the wall remote from the anchor member, a centrally apertured hollow dome-shaped sealing cap positioned against the face of said wall remote from the anchor member in covering relation to the hole of said wall with the aperture of said cap receiving said bolt, and a nut on said bolt disposed on the side of said cap remote from said anchor for tightening the sealing cap into sealing relation across said wall hole.

References Cited in the file of this patent

UNITED STATES PATENTS

| | | |
|---|---|---|
| 1,999,704 | Rigney | Apr. 30, 1935 |
| 2,181,278 | Lantz | Nov. 28, 1939 |
| 2,616,585 | Condit et al. | Nov. 4, 1952 |